3,098,079
A-NORTESTOLOLACTONES
Allen I. Laskin and Frank L. Weisenborn, Somerset, N.J., assignors to Olin Mathieson Chemical Corporation, New York, N.Y., a corporation of Virginia
No Drawing. Filed Apr. 30, 1962, Ser. No. 191,255
4 Claims. (Cl. 260—343.2)

This invention relates to, and has for its object, the provision of compounds of the formula

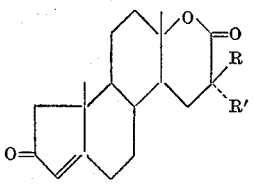

wherein R is hydrogen, R' is α-hydroxy or acyloxy and together R and R' is keto.

The preferred acyloxy radicals are those of hydrocarbon carboxylic acids of less than twelve carbon atoms, as exemplified by the lower alkanoic acids (e.g., acetic, propionic, butyric and tert-pentanoic acids), the lower alkanoic acids, the monocyclic aryl carboxylic acids (e.g., benzoic and toluic acids), the monocyclic aryl lower alkanoic acids (e.g., phenacetic and β-phenylpropionic acid), the cycloalkane carboxylic acids and the cycloalkene carboxylic acids.

The compounds of this invention are pharmacologically active substances, which, unlike testololactone, possess anti-androgenic activity and in addition are useful to augment the protein-anabolic activity of protein-anabolic steroids. Hence, the new compounds of this invention can be used in conjunction with known protein-anabolic steroids, such as testosterone propionate, in the treatment of post-operative shock and other conditions where tissue degeneration has occurred; or they can be used per se as anti-androgenic agents. In either event, they may be administered either perorally or parenterally, being formulated for such administration in the same type of preparations as testosterone propionate, for example, with concentration and/or dosage based on the activity of the particular compound.

It has further been found that one of the compounds of this invention, namely, 16α-hydroxy-A-nortestololacetone (R is hydrogen, R' is α-hydroxy) can be prepared from A-nortestololactone by subjecting the latter to the action of a microorganism of the genus Streptomyces or to the action of the enzymes thereof, under oxidizing and preferably aerobic conditions; and further, that this new compound can either be oxidized to another of the compounds of this invention, namely, 16-keto-A-nortestololactone, or esterified to yield the 16α-acyloxy derivatives.

The microorganisms of the genus Streptomyces, which may be satisfactorily employed in the practice of this invention include *S. roseochromogenus, S. olivaceus, S. californicus, S. coelicolor, S. viridis, S. argenteolus, S. vinaceus*, and other like microorganisms. The preferable microorganism employed in the practice of this invention is *Streptomyces roseochromogenous*.

To prepare the compounds of this invention, A-nortestololactone is subjected to the action of enzymes of a microorganism of the genus Streptomyces under oxidizing conditions. This oxidation can best be effected either by including A-nortestololactone in an aerobic culture of the microorganism, or by bringing together, in an aqueous medium, the compounds, air, and enzymes of non-proliferating cells of the microorganism.

In general, the conditions of culturing the Streptomyces microorganism for the purposes of this invention are (except for the inclusion of the A-nortestololactone to be converted), the same as those of culturing various other microorganisms for the production of antibiotics, vitamin $B_{12}$, and other like substances. The microorganism is grown aerobically in contact with (in or on) suitable fermentation medium. A suitable medium essentially comprises a source of carbon and energy. The latter may be a carbohydrate (such as sucrose, molasses, glucose, maltose, starch, or dextrin), a fatty acid, a fat and/or the compounds itself. Preferably, however, the medium includes an assimable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are: stearic acid, palmitic acid, oleic acid, linoleic acid and myristic acid.

The source of nitrogenous factors utilizable for the purposes of this invention may be organic (e.g., soybean meal, cornsteep liquor, meat extract and/or distiller's solubles) or synthetic (i.e., composed of simple, synthesizable organic or inorganic compounds such as ammonium salts, alkali nitrates, amino acids or urea).

An adequate sterile air supply should be maintained during fermentation, for example, by the conventional methods of exposing a large surface of the medium to air, or by utilizing submerged aerated culture. The compound may be added to the culture during the incubation period, or included in the medium prior to sterilization or innoculation. The preferred (but not limiting) range of the concentration of the compound in the culture is about 0.01 to about 0.10%. The culture period (or rather the time of subjecting the compound to the action of the enzyme) may vary considerably, the range of about 6 to 96 hours being feasible, but not limiting.

The process yields, inter alia, 16α-hydroxy-A-nortestololactone, which may be separated from the broth by extraction and from other concomitantly produced compounds by fractional crystallization. 16α-hydroxy-A-nortestololactone can, if desired, either be esterified in the usual manner, as by treatment with the desired acid anhydride or acyl halide in an organic solvent (preferably in an organic base such as pyridine) to yield 16α-acyloxy-A-nortestololactone, or oxidized in the usual manner, as by treatment with a hexavalent chromium compound (e.g., chromic acid) to give 16-keto-A-nortestololactone.

The following examples are illustrative of the invention:

EXAMPLE 1

*16α-Hydroxy-A-Nortestololactone*

(a) *Fermentation.*—A fermentation medium of the following composition is prepared:

| | G. |
|---|---|
| Dextrose | 10 |
| Cornsteep liquor | 6 |
| $NH_4H_2PO_4$ | 3 |
| Difco yeast extract | 2.5 |
| $CaCl_3$ | 2.5 |

Water to make 1 liter.

The pH of the medium is adjusted to 7.0±0.1 with 2 N NaOH solution, and 50 ml. portions of the medium are distributed in 250 ml. Erlenmeyer flasks, the flasks plugged with cotton and sterilized by autoclaving for 30 minutes at 120° C. When cool, two of the flasks are each innoculated with 1 ml. of a suspension of the surface growth of 14-day old agar slant (10 g. glucose; 2.5 g. yeast extract; 1 g. $K_2HPO_4$; 20 g. agar; distilled water to one liter) culture of *Streptomyces roseochromogenus* (Waksmann Collection No. 3689), the suspension being made in 2.5 ml. of water with 0.01% of sodium lauryl sulfate as a wetting agent.

The flasks are then mechanically shaken for 96 hours at 25° C. on a 280 cycle per minute rotary shaker, after which about 10% (v./v.) is transferred to each of 12 flasks each containing 50 ml. of the fresh sterile fermentation medium described above. After 72 hours of incubation, 10% (v./v.) is transferred to each of 67 flasks, each containing 50 ml. of the fresh sterile fermentation medium described above. A-nortestololactone is then added by supplementing each flask with 0.25 ml. of a sterile solution of the steroid in N,N-dimethylformamide (60 mg./ml.) so that the medium contains 300 mg./ml. of the steroid. The flasks are then incubated an additional 48 hours, after which the flasks are harvested and the contents filtered through a Seitz clarifying pad and washed with successive 50 ml. portions of warm water. The combined filtrate and washings having a volume of 3,850 ml. and a pH of 6.5 is adjusted to pH 2.5 with concentrated HCl.

(b) *Isolation of 16α - hydroxy-A-nortestololactone.*—The thus-obtained culture filtrate is extracted with three one liter portions of chloroform, the combined chloroform extracts are washed with water, saturated with sodium chloride solution, dried over magnesium sulfate, and concentrated to dryness in vacuo. The residue from the chloroform solution is recrystallized from methylene chloride acetone to yield 790 mg. of pure 16α-hydroxy-A-nortestololactone having the following properties: M.P. about 202–203° C.; [α]$_D$–114° (chlf.)

*Analysis.*—Calcd. for $C_{18}H_{24}O_4$: C, 71.02; H, 7.95. Found: C, 70.93; H, 7.86.

16α-hydroxy-A-nortestololactone may be esterified as illustrated in the following example.

EXAMPLE 2

*16α-Hydroxy-A-Nortestololactone-16α-Acetate*

A solution of 25 mg. of 16α-hydroxy-A-nortestololactone in 0.5 ml. of acetic anhydride and 0.5 ml. of pyridine is allowed to stand at room temperature for 48 hours. After removal of the reagents in high vacuum, the residue is crystallized from acetone-hexane. This yields pure 16α-hydroxy-A-nortestololactone-16α-acetate.

Similarly, by substituting other acid anhydrides, such as propionic anhydride, or acyl halides, such as benzoyl chloride, for the acetic anhydride in the procedure of Example 2, the corresponding ester derivatives are produced.

16α-hydroxy-A-nortestololactone can be oxidized to 16-keto-A-nortestololactone as illustrated by the following example.

EXAMPLE 3

*16-Keto-A-Nortestololactone*

A solution of 16α-hydroxy-A-nortestololactone in acetone is oxidized at room temperature with a solution containing 5 mg. of chromic acid per ml. and an equivalent amount of sulfuric acid in acetone. After 45 minutes excess chromic acid is destroyed with methanol and the solution is concentrated in vacuo. The residue is distributed between chloroform and water, the chloroform solution extracted with sodium bicarbonate and water, dried and evaporated to dryness in vacuo. The residue is recrystallized from acetone-hexane to yield 16-keto-A-nortestololactone.

This invention may be variously otherwise embodied within the scope of the appended claims.

What is claimed is:

1. A compound of the formula

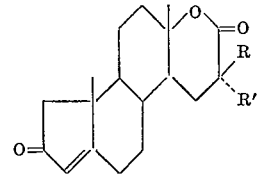

wherein R is hydrogen, R' is selected from the group consisting of α-hydroxy and α-acyloxy, wherein the acyl radical is of an unsubstituted organic hydrocarbon carboxylic acid of less than twelve carbon atoms selected from the group consisting of lower alkanoic acids, monocyclic aryl carboxylic acids, monocyclic aryl lower alkanoic acids, cycloalkane carboxylic acids and cycloalkene carboxylic acids, and together R and R' is keto.

2. 16α-hydroxy-A-nortestololactone.
3. 16α-hydroxy-A-nortestololactone-16α-acetate.
4. 16-keto-A-nortestololactone.

References Cited in the file of this patent

UNITED STATES PATENTS

| | | |
|---|---|---|
| 2,760,966 | Knowles | Aug. 28, 1956 |
| 2,806,038 | Picha | Sept. 10, 1957 |
| 2,888,384 | Murray et al. | May 26, 1959 |
| 2,955,075 | Thoma et al. | Oct. 4, 1960 |
| 2,998,428 | Laskin et al. | Aug. 29, 1961 |

FOREIGN PATENTS

| | | |
|---|---|---|
| 792,803 | Great Britain | Apr. 2, 1958 |

OTHER REFERENCES

Fried et al.: Recent Prog. in Hormone Res., volume 11 (1955), page 152.